United States Patent
Austin et al.

(10) Patent No.: US 8,389,943 B2
(45) Date of Patent: Mar. 5, 2013

(54) MODELING OF THE POINT-SPREAD-FUNCTION IN SINGLE-PINHOLE AND MULTI-PINHOLE SPECT RECONSTRUCTION

(75) Inventors: Derek W. Austin, Knoxville, TN (US); Mu Chen, Knoxville, TN (US); Bing Feng, Knoxville, TN (US); Robert A. Mintzer, Knoxville, TN (US); Anne M. Smith, Lenoir City, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 760 days.

(21) Appl. No.: 12/568,339

(22) Filed: Sep. 28, 2009

(65) Prior Publication Data

US 2010/0080339 A1    Apr. 1, 2010

Related U.S. Application Data

(60) Provisional application No. 61/000,947, filed on Sep. 29, 2008.

(51) Int. Cl.
*G01T 1/166* (2006.01)
*G01T 1/00* (2006.01)

(52) U.S. Cl. ......... 250/363.04; 250/363.01; 250/363.03; 250/363.1; 378/4

(58) Field of Classification Search ............... 250/363.1, 250/363.01, 363.04, 369; 378/147, 149, 378/4, 19, 901
See application file for complete search history.

(56) References Cited

U.S. PATENT DOCUMENTS 7,385,200 B2    6/2008    Vija
2004/0239941 A1    12/2004    Schramm et al.

OTHER PUBLICATIONS

F. P. DiFilippo, M. J. Riffe, K. M. Harsch, N. P. McCabe, and W. D. Heston, "Detached multipinhole small animal SPECT devices with real-time calibration," IEEE Trans. Nucl. Sci., vol. 53, pp. 2605-2612, 2006.

G. Bal, and P. D. Acton, "Analytical derivation of the point spread function for pinhole collimators," Phys. Med. Biol., vol. 51, pp. 4923-4950, 2006.

J. Gregor, T. Benson, S. Gleason, M. Paulus, S. Figueroa, T. Hoffman, S. Kennel, and J. Wall, "Approximate volumetric system models for microSPECT," IEEE Trans. Nucl. Sci., vol. 53, pp. 2646-2652. Oct. 2006.

(Continued)

*Primary Examiner* — David Porta
*Assistant Examiner* — Yara Green
(74) *Attorney, Agent, or Firm* — Peter Kendall (57) ABSTRACT

A system and method for reconstructing single photon emission computed tomography data acquired with a pinhole collimator includes sub-dividing each voxel in the imaging target object space into sub-voxels and sub-dividing each of the detector bins in the gamma camera detector into sub-bins, connecting the centers of each of the sub-voxels to each of the detector sub-bins through a pinhole provided in the pinhole collimator by ray tracing and for each ray connecting the centers of each of the sub-voxels to each of the detector sub-bins, the transmission probability is calculated by analytically solving the intersections between the ray and the pinhole surfaces. Then, a geometric-response-function of the pinhole collimator is computed which is then convolved with the intrinsic-response-function of the detector to obtain the PSF.

6 Claims, 9 Drawing Sheets

OTHER PUBLICATIONS

F. P. DiFilippo, "A sensitivity model for multi-pinhole SPECT," IEEE Nuclear Science Symposium Conference Record, vol. 3, pp. 1842-1847, 2006.

S. D. Metzler, J. E. Bowsher, M. F. Smith, and R. J. Jaszczak, "Analytic determination of pinhole collimation sensitivity with penetration," IEEE Trans. Med. Imag., vol. 20, pp. 730-740, 2001.

F. van der Have, B. Vastenhouw, M. Rentmeester, and F. J. Beekman, "System calibration and statistical image reconstruction for sub-mm stationary pinhole SPECT," IEEE Nuclear Science Symposium Conference Record, pp. 2653-2657, 2005.

M. Gieles, H. W. A. M. de Jong, and F. J. Beekman, "Monte Carlo simulations of pinhole imaging accelerated by kernel-based forced detection," Phys. Med. Biol., vol. 47, pp. 1853-1867, 2002.

K. Sundin and M. Ljungberg, "SIMIND based pinhole imaging: Development and validation," IEEE Nuclear Science Symposium Conference Record, vol. 5. pp, 3998-4005, 2007.

C. Wietholt, I-T. Hsiao, and C.-T. Chen, "New ray-driven system matrix for small-animal pinhole-SPECT with detector blur, geometric response and edge penetration modeling," IEEE Nuclear Science Symposium Conference Record, pp. 3414-3419, 2006.

N. U. Schramm, G. Ebel, U. Engeland, T. Schurrat, M. Béhé, and T. M. Behr, "High-resolution SPECT using multipinhole collimation," IEEE Trans. Nucl. Sci., vol. 50, pp. 315-320, 2003.

T. Funk, D. L. Kirch, M. Sun, E. W. Izaguirre, J. E. Koss, S. Prevrhal, and B. H. Hasegawa, "Simulation and validation of point spread functions in pinhole SPECT imaging," IEEE Trans, Nucl. Sci., vol. 53, pp. 2729-2735, 2006.

MODELING OF THE POINT-SPREAD-FUNCTION IN SINGLE-PINHOLE AND MULTI-PINHOLE SPECT RECONSTRUCTION

CROSS-REFERENCE TO RELATED APPLICATIONS

This is a non-provisional application of pending U.S. provisional patent application Ser. No. 61/100,947, filed Sep. 29, 2008, the entirety of which application is incorporated by reference herein.

FIELD OF THE DISCLOSURE

The present disclosure is related to methods for reconstructing single photon emission computed tomography (SPECT) data acquired with a multi-pinhole system.

BACKGROUND

Single-pinhole and multi-pinhole SPECT imaging are used increasingly in clinical organ specific studies and pre-clinical studies using small animals. One advantage of pinhole collimation with magnification is sub-millimeter resolution which is not achievable for parallel-beam SPECT. Multi-pinhole SPECT with overlapping counts is also used to improve sensitivity over single-pinhole SPECT.

In the conventional reconstruction of SPECT data acquired with pinhole systems, the point-spread-function (PSF) is either approximated by analytic equations or a simple volumetric intersection model, or substituted by a sensitivity function which is the integral of the PSF. This results in an inaccurate system matrix and loss of resolution for reconstruction. Efforts have been made to directly measure the system matrix using a point source and to model the PSF using Monte Carlo simulations, but those are very tedious, time consuming approaches and thus somewhat impractical, especially for a system with removable pinhole plates which may need to be calibrated frequently.

Desirable in the art is an improved method of calculating the PSF for a pinhole system in order to improve image resolution.

SUMMARY

According to a preferred implementation of the present disclosure, a method for reconstructing single photon emission computed tomography data acquired with a pinhole collimator is disclosed. The method comprises sub-dividing each voxel in the imaging target object into sub-voxels and sub-dividing each of the detector bins in the detector into sub-bins. Next, the centers of each of the sub-voxels are connected to each of the detector sub-bins through a pinhole provided in the pinhole collimator by ray tracing. For each ray connecting the centers of each of the sub-voxels to each of the detector sub-bins, the transmission probability is calculated by analytically solving the intersections between the ray and the pinhole surfaces. Then, a geometric-response-function of the pinhole collimator is computed which is then convolved with the intrinsic-response-function of the detector to obtain the PSF. Our method analytically and accurately calculates the path length through the pinhole plate for each ray by solving equations.

According to another embodiment, the pinhole collimator is a multi-pinhole collimator and the method steps described are repeated for each of the pinholes provided in the multi-pinhole collimator.

According to another embodiment, a single photon emission computed tomography system is disclosed. The system comprising a machine-readable storage medium and a system controller connected to and in communication with a gamma camera detector provided with a pinhole collimator and the machine-readable storage medium. The machine-readable storage medium is encoded with a computer program code such that, when the computer program code is executed by the system controller, the system controller performs a method for reconstructing single photon emission computed tomography data acquired with the pinhole collimator. The method comprises sub-dividing each voxel in the imaging target object into sub-voxels and sub-dividing each of the detector bins in the detector into sub-bins. Next, the centers of each of the sub-voxels are connected to each of the detector sub-bins through a pinhole provided in the pinhole collimator by ray tracing. For each ray connecting the centers of each of the sub-voxels to each of the detector sub-bins, the transmission probability is calculated by analytically solving the intersections between the ray and the pinhole surfaces. Then, a geometric-response-function of the pinhole collimator is computed which is then convolved with the intrinsic-response-function of the detector to obtain the PSF.

BRIEF DESCRIPTION OF THE DRAWINGS

The accompanying drawings illustrate preferred embodiments of the disclosed method so far devised for the practical application of the principles thereof, and in which.

DETAILED DESCRIPTION

To improve the SPECT image resolution while eliminating or reducing the need for experimental PSF measurements and Monte Carlo simulations, the inventors developed a method to numerically calculate the PSF for a pinhole collimator SPECT system by ray-tracing. The method is applicable to both a single-pinhole and a multi-pinhole collimator. According to an implementation of the method, the probability of photon penetration through a pinhole edge is calculated using the actual geometry of the pinhole and the total attenuation coefficient for the photon energy and the pinhole material. The relatively small fraction of photons that actually scatter in the pinhole collimator are ignored at the low photon energies of emitters commonly used in small animal SPECT, that is they are treated as having been absorbed.

According to the present disclosure, the PSF of the SPECT data acquired with a pinhole collimator is the convolution of the geometric-response-function of the pinhole collimator and the intrinsic-response-function of the gamma camera detector. The intrinsic-response-function is the response of the gamma camera, excluding the collimator, to a pencil beam of radiation. It is determined by two factors: the uncertainty of position estimation in the camera-detector system and the effects of scattering in the scintillation crystal in the gamma camera detector. In the confirmation experiments discussed below, a pixelated NaI(Tl) gamma camera detector with 2.2 mm crystal pitch was utilized and the intrinsic-response-function was assumed to be a Gaussian with 2 mm full width at half maximum (FWHM).

Figure 1:
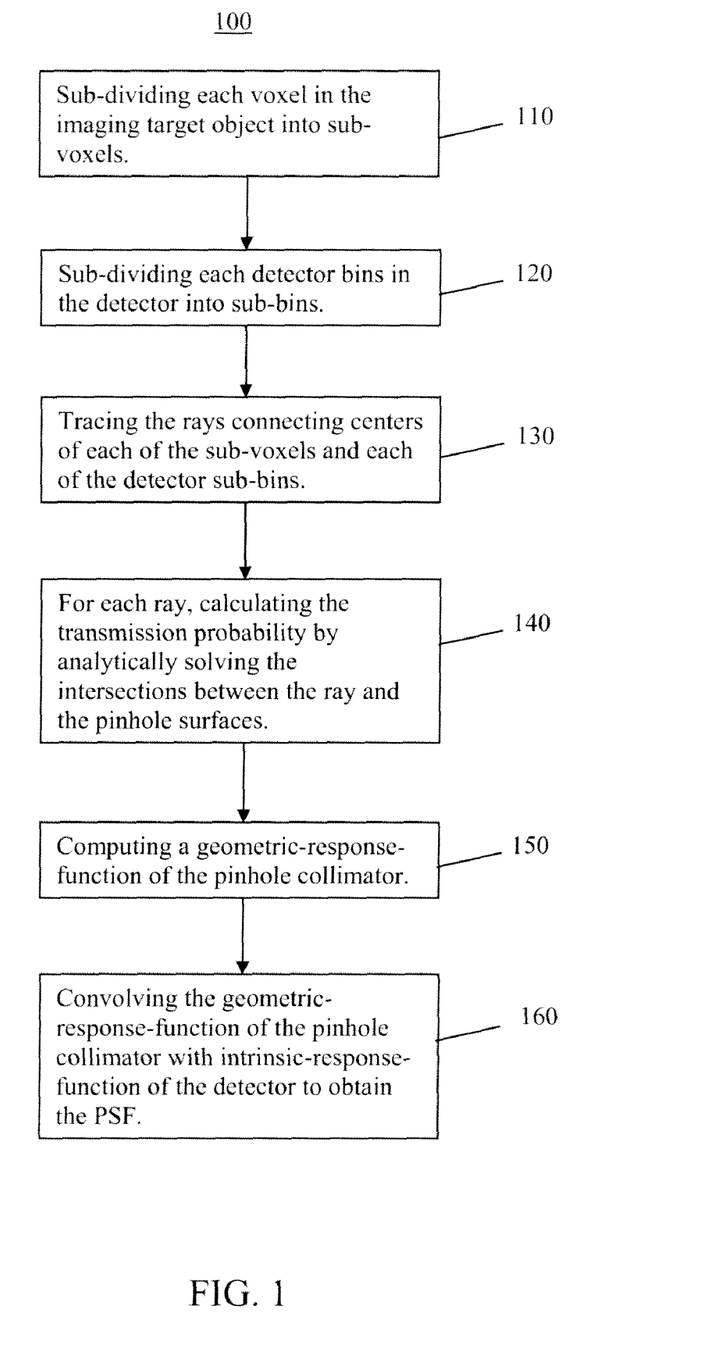
FIG. 1 is a flow chart illustrating the disclosed method.

FIG. 1 is a flow chart 100 illustrating the method for calculating the PSF in reconstructing SPECT data acquired with a pinhole collimator according to a preferred implementation. The method comprises, sub-dividing each voxel in the image target object space into sub-voxels (see block 110) and sub-dividing each detector bin (pixel) into sub-bins (see block 120). Next, rays connecting the centers of each of the sub-voxels to each of the detector sub-bins are traced (see block 130). The tracing of the rays weighs the contribution of each ray by the solid angle and transmission by the pinhole collimator. For each ray, the transmission probability is calculated by analytically solving the intersections between the ray and the pinhole surfaces (see block 140). Next, the geometric-response-function of the pinhole collimator is then calculated (see block 150). Then, the geometric-response-function of the pinhole collimator is convolved with the intrinsic-response-function of the gamma camera detector to obtain the PSF (see block 160). This method is applicable to both a single-pinhole collimator SPECT system as well as a multi-pinhole collimator SPECT system. The method illustrated by the flow chart 100 is carried out for one pinhole in a pinhole collimator and when applied to a multi-pinhole collimator SPECT system, the process is repeated for each of the pinholes.

The method according to the present disclosure will be explained in more detail using a multi-pinhole collimator case as an example. The geometric-response-function for the system ($grf_{ji}$) is expressed as the sum of geometric-response-functions for each pinhole ($grf_{ji}^k$):

$$grf_{ji} = \sum_{k=1}^{N} grf_{ji}^k, \quad (1)$$

where N is the number of pinholes (N=1 is for a single-pinhole case), j is the voxel index in the object space and i is the index for the detector bin on the detector. For a certain pinhole, $grf_{ji}^k$ is non-zero for only a small region on the detector. Based on simple geometric consideration, the extent of $grf_{ji}^k$ can be roughly estimated by $$W = (1+m)D_e, \quad (2)$$

where W is the width of $grf_{ji}^k$, is the magnification and $D_e$ is the effective pinhole diameter.

In practice, only calculate $grf_{ji}^k$ for 3×3 or 5×5 detector bins (with the bin size of 2.2 mm) centered at the intersection of the line connecting the centers of voxel j and the pinhole keel by the detector. For pinhole plates with magnifications around 3, choosing the kernel size of 3×3 or 5×5 is based on the pinhole diameter. For pinholes with a diameter smaller or equal to 1 mm, the kernel size of 3×3 is used, for larger pinholes the kernel size is increased to 5×5 to avoid truncation of the PSF. Sub-dividing the image voxel and detector bin, we write $grf_{ji}^k$ as the sum of contributions from each sub-voxel to each sub-detector-bin:

$$grf_{ji}^k = \sum_{\tilde{j}} \sum_{\tilde{i}} grf_{\tilde{j}\tilde{i}}^k, \quad (3)$$

where $grf_{\tilde{j}\tilde{i}}^k$ is the response from sub-voxel $\tilde{j}$ at sub-detector bin $\tilde{i}$, which is calculated by $$grf_{\tilde{j}\tilde{i}}^k = \Omega_{\tilde{j}\tilde{i}}^k Tr_{\tilde{j}\tilde{i}}^k, \quad (4)$$

where $\Omega_{\tilde{j}\tilde{i}}^k$ is the solid angle that sub-detector-bin $\tilde{i}$ subtends at the center of the sub-voxel $\tilde{j}$, $Tr_{\tilde{j}\tilde{i}}^k$ is the transmission by the collimator plate for the ray from the sub-voxel $\tilde{j}$ to sub-detector-bin $\tilde{i}$. The numbers of sub-voxels and sub-detector-bins will affect the discretization error. For example, consider the sensitivity calculated for a 0.5 mm diameter pinhole with 95 mm focal length and 0.2 mm keel at 120 mm source-detector distance, the discretization error is 1.8% for using 10×10 sub-detector-bins when compared to 1000×1000 sub-detector-bins which is treated as the true value of the sensitivity. More accurate calculations can be achieved by using higher number of sub-voxels and sub-bins but the accuracy comes with a sacrifice on the speed of the reconstruction. More sub-voxels and sub-bins mean more rays to trace and, thus, require more calculations. As a compromise between the computational speed and accuracy, the inventors used 2×2×2 sub-voxels and 10×10 sub-bins in the example case described herein.

Figure 2:
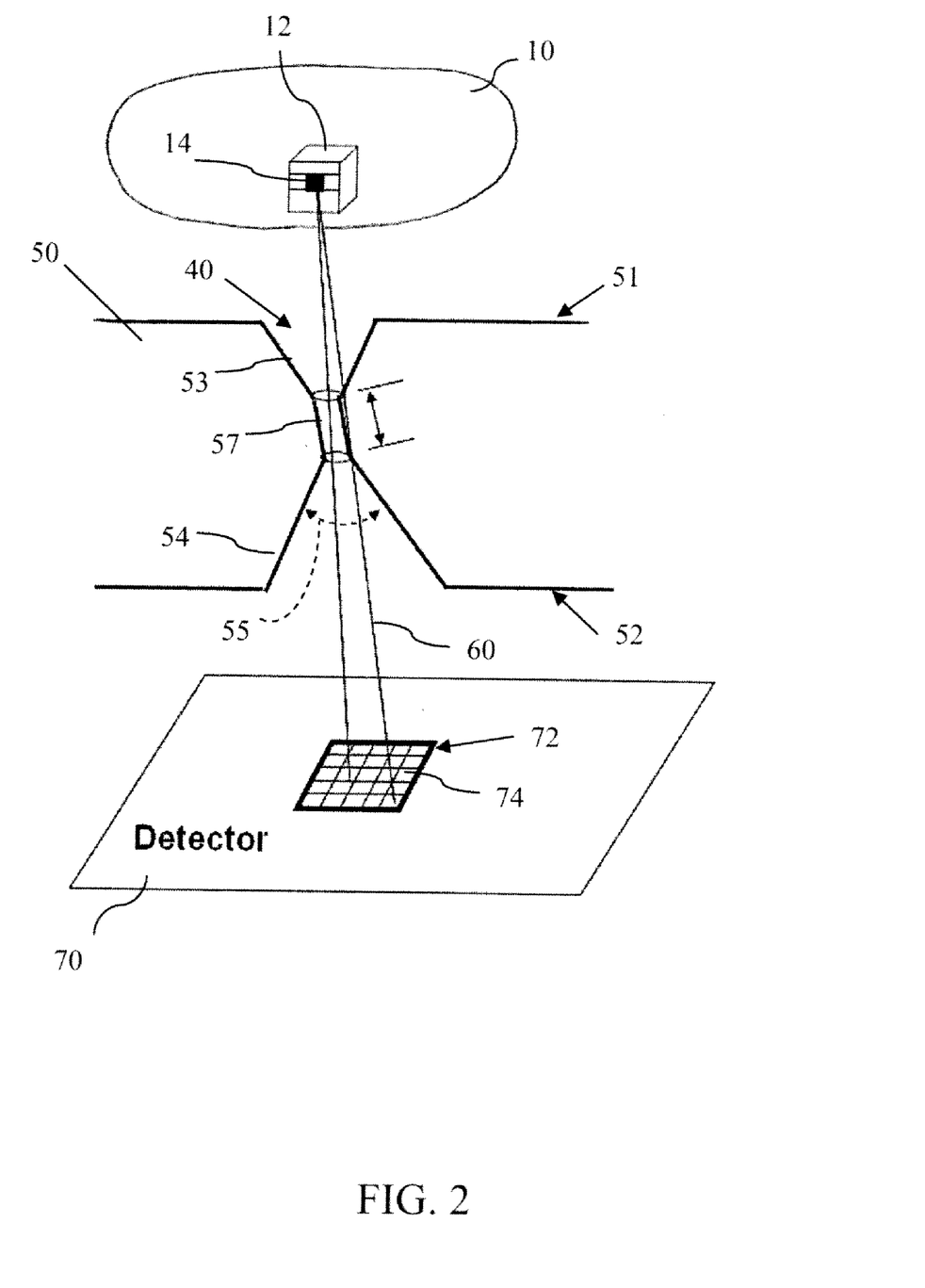
FIG. 2 is a is a schematic diagram showing the geometry of the imaging target object, the pinhole collimator plate, and the detector.

Referring to the configuration shown in FIG. 2, to calculate the transmission by the pinhole collimator plate 50 along each ray, a ray is traced through the pinhole collimator by analytic calculations. The pinhole 40 in the pinhole collimator plate 50 forms a hollowed region through the collimator plate 50 defined by the two planes 51, 52 (the upper and lower surfaces of the pinhole collimator plate 50, respectively), two conical spaces 53, 54 (defined by the aperture angle 55) and a cylinder 57 (defined by the keel 53). If the path length of each ray 60 in the hollowed region is known, we can calculate the path length in the pinhole collimator plate 50 and the penetration of the pinhole collimator plate by the photons. Note that the path length for the attenuation calculation is the path through the material, and we calculate it as the difference between the air path length and the path length between the two planes.

Thus, each ray 60 is traced through the air region enclosed within the hollowed region of the pinhole 40 to calculate the path length (called "air length" hereafter). Since the surfaces of the enclosed air region can be described by either linear (for the two planes 51, 52) or quadratic equations (for the cones 53, 54 and the cylinder 57), the intersections by a ray 60 can be solved analytically.

To calculate the transmission probability for each ray, the intersections between the ray and the pinhole surfaces are determined. As the rays are traced through the air region, sequential determinations are made as to whether a given ray 60 goes into or out of the air region and intersect with the upper plane 51, the upper cone 53, the cylindrical keel 57, the lower cone 54, or the lower plane 52. At each intersection, the status of going into or out of the enclosed air region alternates. For each ray exiting the air region, the line segment from the last going-in point is added to the total air length. The path length (L) in the attenuator (pinhole-plate) is the length between the two planes minus the total air length. The transmission probability for that ray is calculated as exp(−mu*L).

The energy-dependency of attenuation is reflected by the collimator material's linear total attenuation coefficient used in the calculation. In one example, the narrow-beam (containing no scatter) value (e.g., 36.3 cm$^{-1}$ at 140 keV for Tc-99m) of the linear attenuation coefficient of Tungsten alloy was used and the beam scatter with the collimator was ignored. Alternatively, by using an effective value of the collimator material's linear attenuation coefficient, the beam scatter could be approximated in the calculations.

To speed up the calculation while saving memory space, the geometric-response-function (grf$_{ji}$) is calculated for only one detector angle (usually angle zero). A Gaussian rotator is used to rotate the image grid for other detector angles. A Gaussian rotator is described in J. W. Wallis and T. R. Miller, "An optimal rotator for interative reconstruction," *IEEE Trans. Med. Imag.*, vol. 16, pp. 118-123, 1997, the contents of which is incorporated herein by reference. The Gaussian rotator is a method to obtain a two-dimensional ("2D") image in the coordinate system rotating with the gamma camera by interpolating the stationary 2D image slice in the global system with a 2D Gaussian function. The advantage of the Gaussian rotator is that the blurring introduced by the interpolation is uniform over all directions and independent of the camera angle. This makes it possible to undo the blurring by accordingly reducing the sigma of the Gaussian function describing the intrinsic resolution of the camera. By carefully choosing the sigma (0.5 pixel in our example) and the kernel size (3×3 in our example), the Gaussian rotator can achieve good accuracy for interpolation (less than 1% error in our example). Higher accuracy can be achieved by using a larger kernel.

Combined with the Gaussian rotator, the PSF is utilized as the system matrix in the iterative reconstruction. Hereinafter, reconstruction modeling of the PSF will be referred to as "PSF-based reconstruction".

As described above, the PSF-based reconstruction projects one point (a sub-voxel 14) in the imaging target object 10 to a small area (a bin 72 comprising a plurality of sub-bins 74) on the detector 70. In contrast, the conventional method of sensitivity-based reconstruction projects one point in the object (by multiplying it by the sensitivity) to only one point on the detector, if ignoring the blurring caused by the intrinsic resolution of the detector. In our implementation of the sensitivity-based reconstruction, used for comparison to the PSF-based reconstruction of the present disclosure, the intrinsic resolution of the detector is always modeled. It is expected that the PSF-based reconstruction should be more accurate than the conventional sensitivity-based reconstruction, because it models the physics of the imaging process more accurately.

In the next section, we describe experiments performed to measure the sensitivities of several keel-edged single-pinhole plates, and compare the measurements with the numerical calculations. We also compare the PSF-based reconstruction with the sensitivity-based reconstruction for imaging an ultra-micro Derenzo phantom with a single pinhole system and a five-pinhole system, and for imaging mouse bone structures with the five-pinhole system. In the implementation of the sensitivity-based reconstruction, we have two options to obtain the sensitivity. One option is calculating the sensitivity with an empirical formula published by DiFilippo, (F. P. DiFilippo, "A sensitivity model for multi-pinhole SPECT," *IEEE Nuclear Science Symposium Conference Record*, vol. 3, pp. 1842-1847, 2006, the contents of which are incorporated herein by reference):

$$P(D_{\mathit{eff}}, \hat{n}_{pin}) = \frac{D_{\mathit{eff}}^2 \cos(\theta)}{16d^2}(1 - \kappa(1 - \cos(\theta)))F_{cut}(\theta), \quad (5)$$

where $D_{\mathit{eff}}$ is the effective pinhole diameter, $\hat{n}_{pin}$ is the normal direction of the pinhole, $\theta$ is the angle between the incident ray and $\hat{n}_{pin}$, $\kappa$ is a second-order coefficient related to the keel length, and $F_{cut}(\theta)$ is a semi-Gaussian model of the sensitivity truncation:

$$F_{cut}(\theta) = \begin{cases} \exp(-(\cos(\theta) - c_0)^2/2\sigma_0^2), & \text{if } \cos(\theta) < c_0 \\ 1, & \text{otherwise,} \end{cases} \quad (6)$$

where $c_0$ is the cosine of the half opening angle, $\sigma_0$ is the sigma of the Gaussian function, which was empirically determined for the Tc-99m by DiFilippo. This formula was obtained by fitting Tc-99m tracer data and the error was shown be within 10% relative to the measurements. Another option to estimate the sensitivity in the sensitivity-based reconstruction is summing the PSF numerically calculated by our method into the sensitivity. In the present disclosure, unless explicitly made clear, the sensitivity-based reconstruction uses the first option, which means the sensitivity is calculated by the equation (5). Below, we show a comparison between the two approaches, along with the improvement achieved by the PSF-based reconstruction method of the inventors.

Experiments

A. Measurements of Sensitivities for Single-Pinhole Plates

As an evaluation of the numerical calculation of the PSF based on the method of the present disclosure, the inventors compared the calculated sensitivities (the integral of the PSF) with the measurements. Comparison of sensitivities is not so dependent on the point-source size, location, and it is independent of the intrinsic blurring function of the gamma camera detector, thus it can facilitate verification of the calculation of the geometric-response-function.

A fillable hollow acrylic sphere of 4 mm inner diameter (Data Spectrum Corporation, Hillsborough, N.C.), serving as a point-like source, was filled with 24 MBq (650 µCi) of Tc-99m and put at the center of the field-of-view (FOV) on a Siemens Inveon® system. Four keel-edged single-pinhole collimator plates were sequentially installed and data were collected for 60 seconds each time. The pinhole diameter (D), focal length (F), keel length (K), and aperture angle (A) for each pinhole collimator plate is listed in Table 1. For each pinhole collimator plate, three measurements were made at three radii-of-rotation (ROR, distance between the center of the FOV and the center of the pinhole keel). The sensitivities were calculated as the ratio of measured count rates to the decay-corrected activities.

TABLE 1

The parameters of the keel-edged single-pinhole plates used in the sensitivity measurements.

| Plates | D (mm) | F (mm) | A (deg) | K (mm) | M |
|---|---|---|---|---|---|
| #1 | 0.5 | 95 | 90 | 0.2 | Tungsten |
| #2 | 1.0 | 95 | 90 | 0.4 | Alloy |
| #3 | 2.0 | 95 | 90 | 0.8 | |
| #4 | 3.0 | 90 | 90 | 1.2 | |

D—Pinhole Diameter, F— Focal Length, A— Aperture Angle, K— Keel Length, and M—Material.

The ultra-micro Derenzo phantom filled with 185 MBq (5 mCi) of Tc-99m was also scanned with five-pinhole collimators (1 mm diameter, 0.2 mm keel length, 90 mm focal length) on a Siemens Inveon® system for 130 minutes. Two detectors, placed 180 degrees apart, with identical pinhole plates were employed in the acquisition. Each detector acquired 60 projections through a 360-degree rotation. The data were reconstructed with the PSF-based and sensitivity-based methods.

For the PSF-based approach, a reconstruction using 2×2×2 sub-voxels (the default) was compared with a reconstruction using 1×1×1 sub-voxel (using the mid-point as the source position). For the sensitivity-based approach, the data with the sensitivity calculated by the empirical formula (5) and the data with the sensitivity from summing the numerically calculated PSF were reconstructed. In each case, reconstruction was performed using 50 iterations of OSEM with 10 subsets.

D. Imaging of a Mouse with Five-Pinhole Plates

Two mouse bone scans were performed using Tc-99m labeled HDP with the five-pinhole plates on a Siemens Inveon® system. Two detectors with identical plates (the same as in were employed in the acquisitions. The two scans were sequentially acquired on the same mouse. The first scan was focused on the mouse body, while the second focused on the mouse head. Forty projections were acquired per detector over 360 degrees in 40 minutes for each scan. The data were reconstructed with the PSF-based and sensitivity-based methods. Each reconstruction used 15 iterations of OSEM with 10 subsets.

Results

A. Measurements of Sensitivities for Single-Pinhole Plates

As stated earlier, the inventors selected the case with the pinhole plate #3 (D=2 mm, K=0.8 mm) at 35 mm ROR to calculate the detector efficiency, because it approximates an ideal pinhole. In support of this claim, the sensitivities calculated from the ideal pinhole model using equation (7) and numerical calculations with and without penetration agree with each other within 2% accuracy (for #3 Pinhole at 35 mm ROR in Table 2). The effective detector efficiency was estimated to be about 0.86.

TABLE 2

Comparison of sensitivities from measurements and numerical calculations.

| Pinhole Plates, D, K (mm) | Sensitivities ($\times 10^{-5}$) | | | |
|---|---|---|---|---|
| | Measurements | Ideal model | Numerical model, no penetration | Numerical model with penetration |
| | ROR | S | | | |
| #1, D = 0.5, K = 0.2 | 25 mm | 4.1 | 2.2 | 2.1 | 3.9 |
| | 30 mm | 2.8 | 1.5 | 1.4 | 2.7 |
| | 35 mm | 2.1 | 1.1 | 1.1 | 2.0 |
| #2, D = 1.0, K = 0.4 | 25 mm | 11 | 8.6 | 8.5 | 10 |
| | 30 mm | 7.5 | 6.0 | 5.9 | 7.0 |
| | 35 mm | 5.5 | 4.4 | 4.4 | 5.1 |
| #3, D = 2.0, K = 0.8 | 25 mm | 35 | 35 | 33 | 35 |
| | 30 mm | 24 | 24 | 23 | 24 |
| | 35 mm | 18 | 18 | 17 | 18 |
| #4, D = 3.0, K = 1.2 | 30 mm | 51 | 54 | 52 | 53 |
| | 35 mm | 38 | 40 | 38 | 39 |
| | 40 mm | 29 | 30 | 29 | 30 |

TABLE 3

Geometric and penetration sensitivity percentages, calculated numerically for the keel-edged pinholes.

| Pinhole Plates, D, K (mm) | ROR (mm) | Geometric (%) | Penetration (%) |
|---|---|---|---|
| #1, D = 0.5, K = 0.2 | 25 | 54.5 | 45.5 |
| | 30 | 52.7 | 47.3 |
| | 35 | 54.2 | 45.8 |
| #2, D = 1.0, K = 0.4 | 25 | 84.9 | 15.1 |
| | 30 | 84.9 | 15.1 |
| | 35 | 85.0 | 15.0 |
| #3, D = 2.0, K = 0.8 | 25 | 99.4 | 0.6 |
| | 30 | 96.7 | 3.3 |
| | 35 | 97.2 | 2.8 |
| #4, D = 3.0, K = 1.2 | 30 | 98.1 | 1.9 |
| | 35 | 98.5 | 1.5 |
| | 40 | 98.3 | 1.7 |

The sensitivities including penetration calculated by the numerical method were in good agreement with the measurements in all cases, with the largest error being less than 7% (the maximum error was seen with Pinhole #2 at 30 mm ROR in Table 2). This showed that the numerical calculations yield good sensitivity estimates, even when the collimator based scatter was excluded from the computation. The ideal (simplified) model gave results close to the measurements for pinhole plates #3 and #4 which have large keel lengths and thus low penetration, but significantly underestimated the sensitivities for pinhole plates #1 and #2, by 47% and 19% respectively, averaging over the three RORs, because the ideal model does not include penetration. By taking the difference between the sensitivities from numerical calculations with and without penetration, the penetration fractions were calculated for pinhole plates #1 through #4, averaging over the three RORs—they were 46%, 15%, 3.2% and 1.7%, respectively. Table 3 lists the geometric and penetration percentages of the sensitivities calculated by the numerical calculations for the four keel-edged pinholes.

B. Imaging of the Ultra-Micro Derenzo Phantom with Single-Pinhole Plates

Figure 3A:
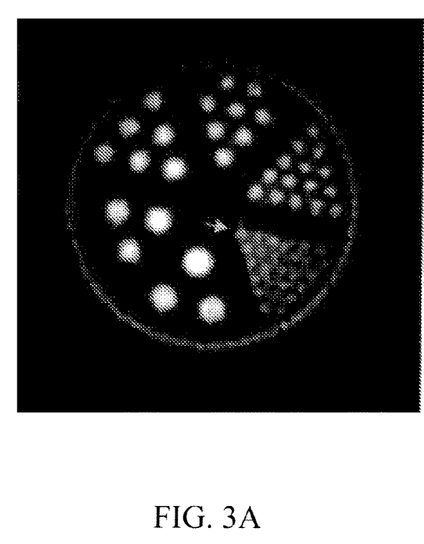
FIG. 3A is a SPECT image reconstructed from a single pinhole acquisition of Tc-99m-filled ultra-micro Derenzo phantom using the conventional sensitivity-based reconstruction.
Figure 3B:
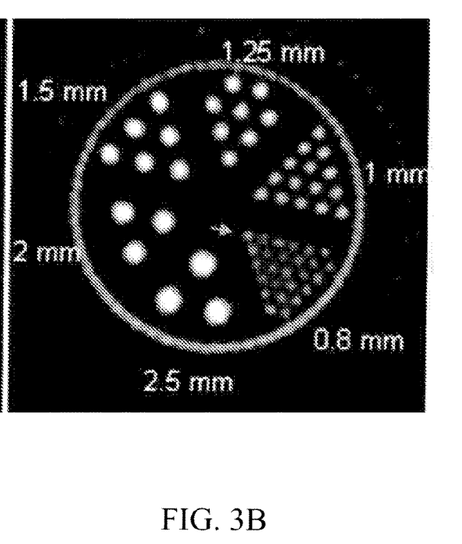
FIG. 3B is a SPECT image reconstructed from a single pinhole acquisition of Tc-99m-filled ultra-micro Derenzo phantom using the PSF-based reconstruction according to an implementation of the present disclosure.
Figure 4:
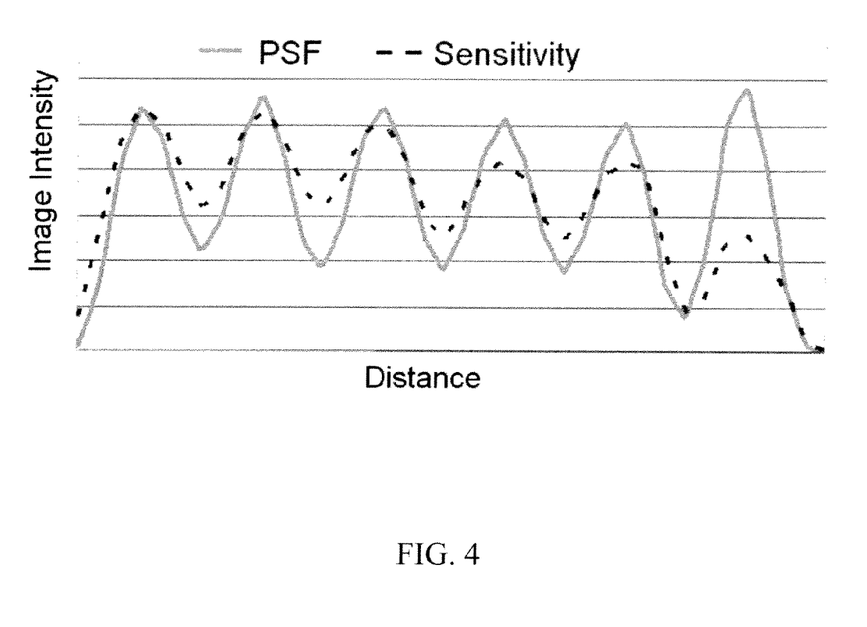
FIG. 4 is a plot showing profiles drawn through the smallest diameter rods in the Derenzo phantom of FIGS. 3A and 3B.

The cross-sectional images reconstructed for the ultra-micro Derenzo phantom acquired with a single pinhole collimator are displayed in FIGS. 3A and 3B. FIG. 3A shows a reconstructed cross-sectional image of the Derenzo phantom reconstructed using the conventional sensitivity-based reconstruction. FIG. 3B shows a reconstructed cross-sectional image of the Derenzo phantom reconstructed using the PSF-based reconstruction according to the present disclosure. The results show that modeling of the PSF improved image resolution. The smallest rods can be separated clearly on the PSF-based image but not on the sensitivity-based image. A profile is drawn through the smallest rods for each case and shown in FIG. 4. The PSF approach shows better contrast on the profile plot. The rods also show more realistic shapes and better count uniformity within the same group of rods on the PSF-based reconstruction, compared to the sensitivity-based reconstruction. The decreased intensity seen on the outer rods on the sensitivity-based reconstruction may be due to the inaccurate system model at large incident angle.

C. Imaging of the Ultra-Micro Derenzo Phantom with Five-Pinhole Plates

Figure 5:
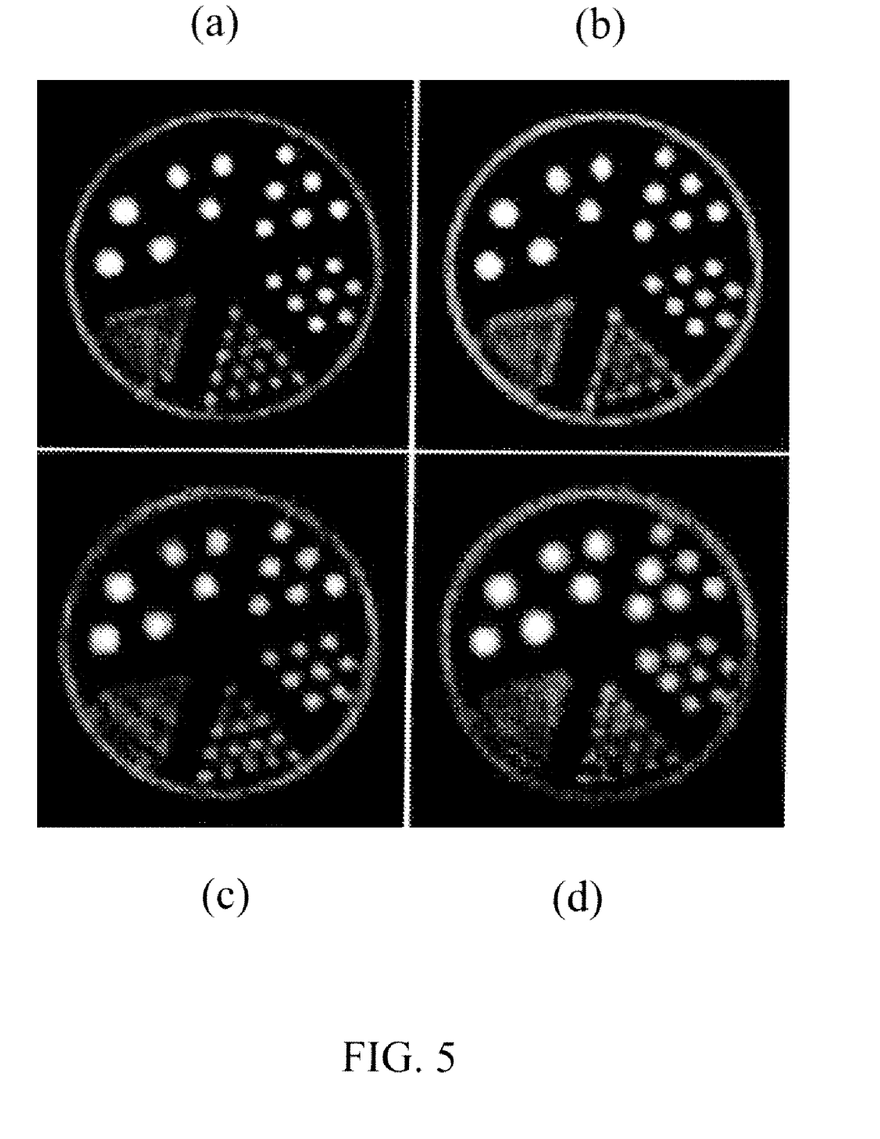
FIG. 5 shows reconstruction of the five-pinhole acquisition of the ultra-micro Derenzo phantom, images (a) and (b) from PSF-based reconstruction with 2×2×2 sub-voxels and 1×1×1 sub-voxels, respectively. The images (c) and (d) from the conventional sensitivity-based reconstruction with 2×2×2 sub-voxels and 1×1×1 sub-voxels, respectively.

The reconstructions of the five-pinhole acquisition for the ultra-micro Derenzo phantom were performed and the images are shown in FIG. 5. Images (a) and (b) from PSF-based reconstruction with 2×2×2 sub-voxels and 1×1×1 sub-voxels, respectively. The images (c) and (d) from the conventional sensitivity-based reconstruction with 2×2×2 sub-voxels and 1×1×1 sub-voxels, respectively. Overall, the PSF-based approach produced images with better resolution, images (a) and (b), than the sensitivity-based approach, the images (c) and (d). Between the two images reconstructed with the PSF-based method, the reconstruction using 2×2×2 sub-voxels (the upper left) show better resolution than image using 1×1×1 sub-voxel (the upper right). The images reconstructed with sensitivity-based method look similar in term of resolution and image quality.

D. Imaging of a Mouse with Five-Pinhole Plates

Figure 6:
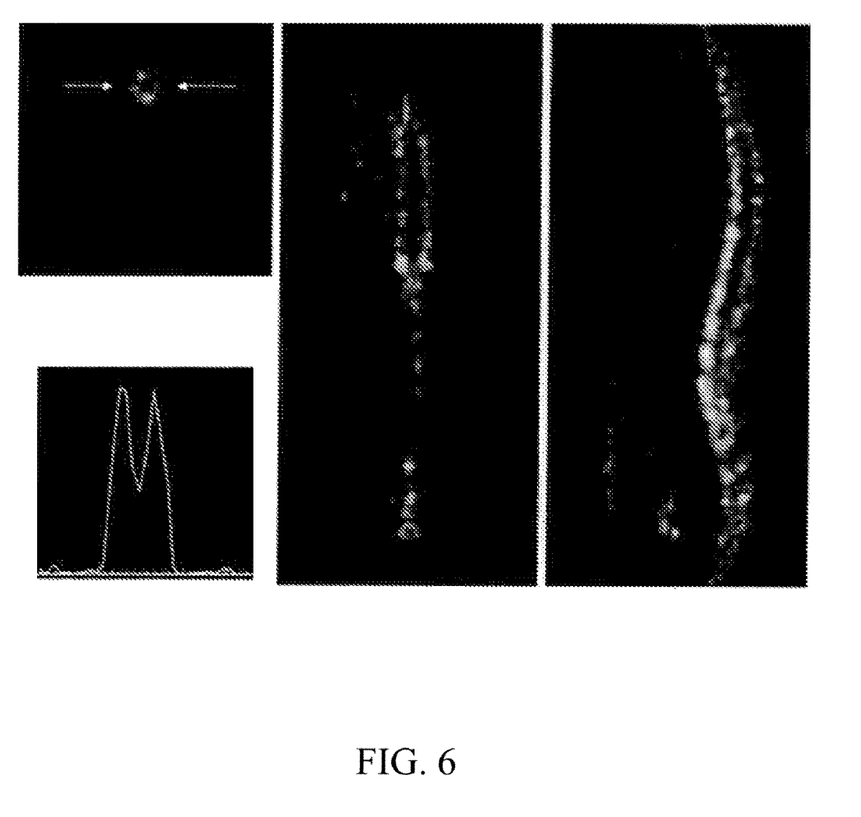
FIG. 6 shows sensitivity-based reconstruction of a first mouse bone scan performed on a five-pinhole SPECT system with Tc-99m labeled HDP. A profile through the spine on a transverse slice is shown in the lower left image.
Figure 7:
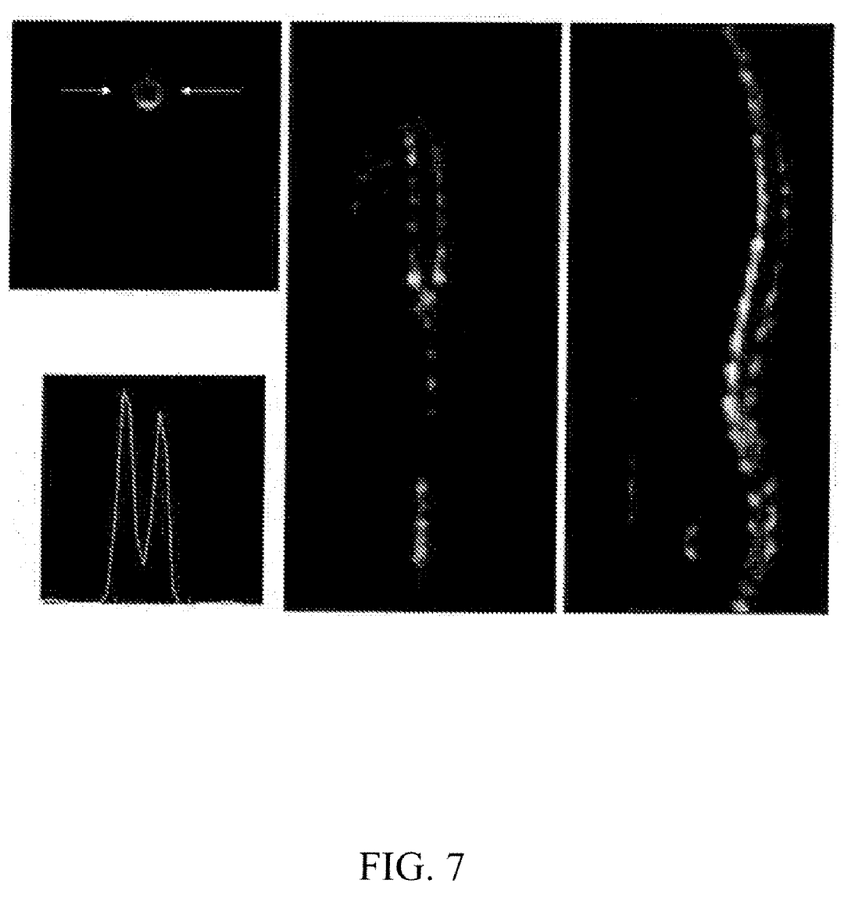
FIG. 7 shows PSF-based reconstruction of the same mouse bone scan as that in FIG. 6. The bone joints and the hallowed cleft in the spine are sharper than in the sensitivity-based reconstruction shown in FIG. 6.

Results from the first mouse scan are shown in FIGS. 6 and 7. The PSF-based reconstruction (FIG. 7) improved the resolution over the sensitivity-based reconstruction (FIG. 6). The bone joints and the hallowed cleft in the spine are sharper in FIG. 7. On the profiles through the central transverse slices (FIG. 6, 7), the PSF-based reconstruction can be seen to have better contrast between the bone and the cleft.

Figure 8:
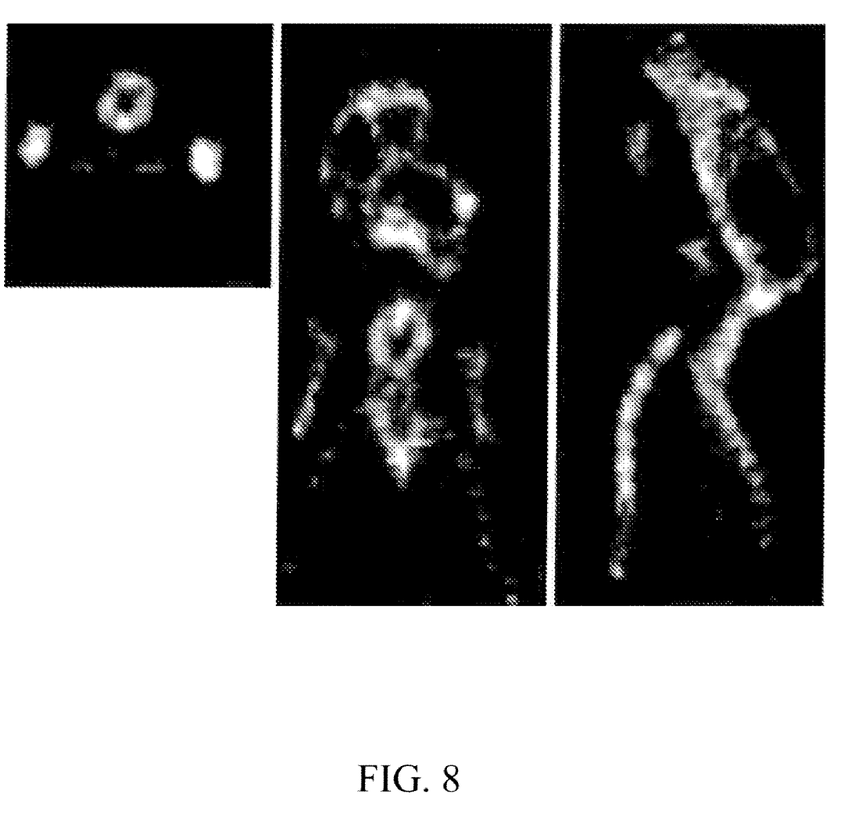
FIG. 8 shows sensitivity-based reconstruction of the second mouse bone scan performed on a five-pinhole SPECT system with Tc-99m labeled HDP.
Figure 9:
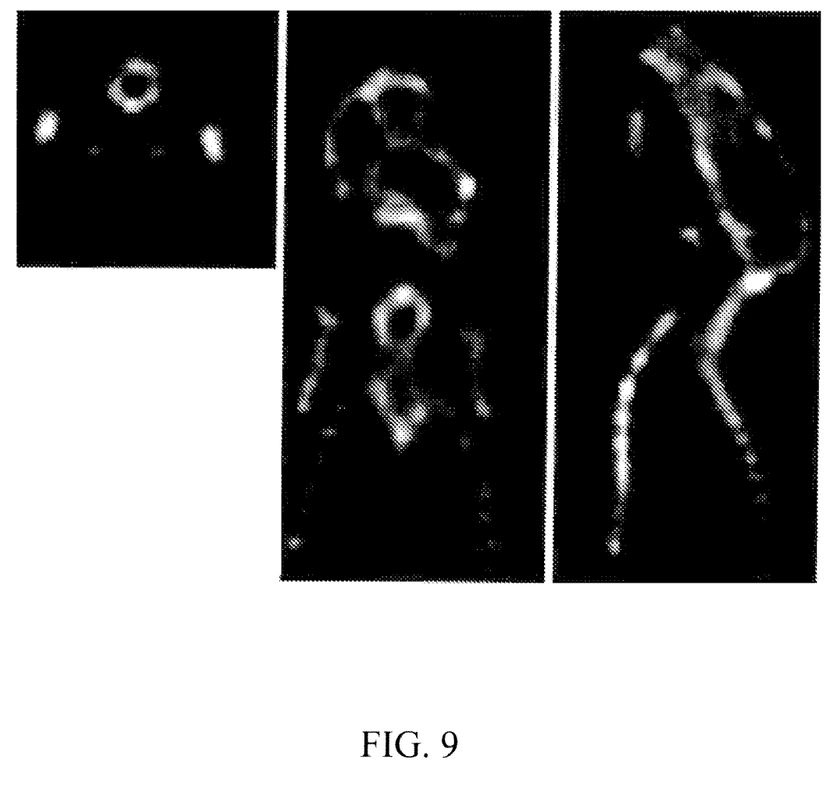
FIG. 9 shows PSF-based reconstruction of the same mouse bone scan as that in FIG. 8. The image reconstructed with PSF-based method shows improved resolution (better defined bone structures and hallowed regions) over the image reconstructed with the sensitivity-based method.

The results from the second mouse scan are shown in FIGS. 8 and 9. The image reconstructed with the PSF-based method (FIG. 9) shows improved resolution over the image reconstructed with the sensitivity-based method (FIG. 8). The bone structures and hallowed regions are better defined and less blurry in the PSF-based reconstruction.

Pinhole collimator based scatter was not modeled in the PSF calculations. The understanding in the art is that such scatter is only a few percent of the total sensitivity for common low energy radioisotopes like Tc-99m, Tl-201, and I-125. For high-energy emitters like I-131 (364 keV), the scatter has been observed to go up to about 20%. In these high-energy emitter cases, the narrow-beam (containing no scatter) value of the linear attenuation coefficient of the collimator material can be replaced by an effective value to compensate for the scatter. The effective value of the linear attenuation coefficient can be estimated from measurements or Monte Carlo simulations. However, this is expected to be a crude correction method, since the scatter from high energy photons has a spatial distribution different from the primary photons.

The intrinsic-response function of the gamma camera detector was assumed to be a Gaussian with a FWHM of 2 mm. A series of values of the FWHM from 0 to 3 mm was also tested and we observed only small changes on the reconstructed images. However, the intrinsic-response function of a pixelated detector (filled with optical reflector in between the crystals) is probably much more complicated than a Gaussian, since the sensitivity not only changes with the incident angle of a photon by the well known cosine factor, but also is affected by the incident angles and location within the pixel, which determine the paths of photons through the crystals and surrounding gaps.

For a helical orbit of the SPECT scanner, the patient bed travels some distance during the SPECT acquisition to extend the axial FOV. The PSF-based code needs only slight changes to work for the helical orbit. As for a circular orbit, the PSF needs to be calculated for one gantry angle, assuming the object is centered at the FOV, and a 3D Gaussian interpolation can be used to rotate and translate the object in the projector/backprojector.

The method of the present disclosure numerically calculates the PSF of pinhole systems with tilted, keel-edged pinholes in iterative reconstruction of SPECT image. Modeling of the PSF by numerical calculations according to the present disclosure increases the resolution of reconstruction for both single pinhole and multi-pinhole SPECT imaging.

The systems and processes illustrated and discussed herein are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention.

We claim:

1. A method for reconstructing single photon emission computed tomography data acquired with a pinhole collimator by determining point-spread-function (PSF), the method comprising:
   (a) sub-dividing each voxel in the imaging target object into sub-voxels;
   (b) sub-dividing each detector bin in the detector into sub-bins;
   (c) connecting centers of each of the sub-voxels to each of the detector sub-bins through a pinhole provided in the pinhole collimator by ray tracing;
   (d) for each ray connecting the centers of each of the sub-voxels to each of the detector sub-bins, calculating each ray's transmission probability by analytically solving the intersections between the ray and the pinhole collimator;
   (e) computing a geometric-response-function of the pinhole collimator; and
   (f) convolving the geometric-response-function of the pinhole collimator with intrinsic-response-function of the detector to obtain the PSF.

2. The method of claim 1, wherein the pinhole collimator is a multi-pinhole collimator having more than one pinhole and the steps (c) through (f) are repeated for each of the pinholes.

3. A single photon emission computed tomography system comprising:
   a machine-readable storage medium; and
   a system controller connected to and in communication with a gamma camera detector provided with a pinhole collimator and the machine-readable storage medium, wherein the machine-readable storage medium is encoded with a computer program code such that, when the computer program code is executed by the system controller, the system controller performs a method for reconstructing single photon emission computed tomography data acquired with the pinhole collimator by determining point-spread-function (PSF), the method, the method comprising:
(a) sub-dividing each voxel in the imaging target object into sub-voxels;
(b) sub-dividing each detector bin in the detector into sub-bins;
(c) connecting centers of each of the sub-voxels to each of the detector sub-bins through a pinhole provided in the pinhole collimator by ray tracing;
(d) for each ray connecting the centers of each of the sub-voxels to each of the detector sub-bins, calculating each ray's transmission probability by analytically solving the intersections between the ray and the pinhole collimator;
(e) computing a geometric-response-function of the pinhole collimator; and
(f) convolving the geometric-response-function of the pinhole collimator with intrinsic-response-function of the detector to obtain the PSF.

4. The system of claim 3, wherein the pinhole collimator is a multi-pinhole collimator having more than one pinhole and the steps (c) through (f) are repeated for each of the pinholes.

5. A machine-readable storage medium, tangibly embodying a program of instructions executable by a processor to perform method steps for reconstructing single photon emission computed tomography data acquired with a pinhole collimator by determining point-spread-function (PSF), the method, the method comprising:
(a) sub-dividing each voxel in the imaging target object into sub-voxels;
(b) sub-dividing each detector bin in the detector into sub-bins;
(c) connecting centers of each of the sub-voxels to each of the detector sub-bins through a pinhole provided in the pinhole collimator by ray tracing;
(d) for each ray connecting the centers of each of the sub-voxels to each of the detector sub-bins, calculating each ray's transmission probability by analytically solving the intersections between the ray and the pinhole collimator;
(e) computing a geometric-response-function of the pinhole collimator; and
(f) convolving the geometric-response-function of the pinhole collimator with intrinsic-response-function of the detector to obtain the PSF.

6. The machine-readable storage medium of claim 5, wherein the pinhole collimator is a multi-pinhole collimator having more than one pinhole and the steps (c) through (f) are repeated for each of the pinholes.

* * * * *